United States Patent
Biery, II et al.

(10) Patent No.: US 10,448,564 B2
(45) Date of Patent: Oct. 22, 2019

(54) MOTOR EXCHANGE SYSTEM FOR A MACHINE

(71) Applicant: Steering Solutions IP Holding Corporation, Saginaw, MI (US)

(72) Inventors: Addney T. Biery, II, Clio, MI (US); Brian G. Maust, Unionville, MI (US); Timothy A. Rohn, Swartz Creek, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 198 days.

(21) Appl. No.: 15/473,795

(22) Filed: Mar. 30, 2017

(65) Prior Publication Data

US 2017/0285592 A1  Oct. 5, 2017

Related U.S. Application Data

(60) Provisional application No. 62/315,247, filed on Mar. 30, 2016.

(51) Int. Cl.
*A01C 19/02* (2006.01)
*G05B 19/042* (2006.01)
*A01C 7/20* (2006.01)

(52) U.S. Cl.
CPC .......... *A01C 19/02* (2013.01); *G05B 19/042* (2013.01); *A01C 7/203* (2013.01); *A01C 7/205* (2013.01); *G05B 2219/25066* (2013.01)

(58) Field of Classification Search
CPC ......... A01C 19/02; A01C 7/203; A01C 7/205; G05B 19/042; G05B 2219/25066

USPC ..................................................... 700/275
See application file for complete search history.

(56) References Cited

U.S. PATENT DOCUMENTS

| | | | | |
|---|---|---|---|---|
| 6,070,539 | A * | 6/2000 | Flamme | A01B 79/005 111/177 |
| 2002/0008439 | A1* | 1/2002 | Senda | H02N 2/14 310/316.02 |
| 2004/0263342 | A1* | 12/2004 | Matlock | H02H 7/0822 340/648 |
| 2008/0197797 | A1* | 8/2008 | El-Ibiary | H02P 5/00 318/567 |
| 2012/0095636 | A1* | 4/2012 | Ishii | A01D 34/64 701/22 |

* cited by examiner

*Primary Examiner* — Ziaul Karim

(57) ABSTRACT

A machine includes a first device, a second device and at least one controller. The first device includes a first motor located at a first address and associated with first operating characteristic data. The second device includes a second motor located at a second address and associated with second operating characteristic data that is substantially the same as the first operating characteristic data. The at least one controller includes a computing processor and a computer readable storage medium, and is configured to communicate with the first and second devices, and store the first and second operating characteristic data while associating the first and second operating characteristic data with the first and second addresses. The exchange of at least one of the first and second motors causes an exchange of the associated one of the first and second operating characteristic data.

16 Claims, 14 Drawing Sheets

MOTOR EXCHANGE SYSTEM FOR A MACHINE

CROSS-REFERENCES TO RELATED APPLICATIONS

This patent application claims priority to U.S. Provisional Patent Application No. 62/315,247, filed Mar. 30, 2016 which is incorporated herein by reference in its entirety.

BACKGROUND OF THE INVENTION

The present disclosure relates to a machine having a multitude of motorized devices, and more particularly, to a motor exchange system of the machine.

Machines, such as an agricultural planter, may include a multitude of motorized devices that may each include a controller, a motor, and an actuator. The devices may serve different functions required by the machine; however, the motors may generally be common for all of the motorized devices. Although each motor may be manufacturer rated with the same torque output, the same horse power, and/or the same operating speed, operating characteristics of each motor may be slightly different. Because the machine may require the same operating characteristics for each motor (i.e., within pre-specified tolerances), the operating characteristics of each motor must be known, and may be determined through diagnostic testing on a test stand.

For more traditional machines, swapping motors between motorized devices of the same machine may not be plausible if the operating characteristic of each motor is not known. This inability of swapping motors may hinder machine production if new motors with known operating characteristics are not readily available. Moreover, if a new motor is available, a technician may be required to hand type the operating characteristic data into a controller of the machine. This manual procedure may introduce potential error. Improvements and enhancements in the ability to perform motor exchanges in a machine having a multitude of motorized devices are desirable.

SUMMARY OF THE INVENTION

In one embodiment of the present disclosure, a machine includes a first device, a second device and at least one controller. The first device includes a first motor located at a first address and associated with first operating characteristic data. The second device includes a second motor located at a second address and associated with second operating characteristic data that is substantially the same as the first operating characteristic data. The at least one controller includes a computing processor and a computer readable storage medium, and is configured to communicate with the first and second devices, and store the first and second operating characteristic data while associating the first and second operating characteristic data with the first and second addresses. The exchange of at least one of the first and second motors causes an exchange of the associated one of the first and second operating characteristic data.

In another embodiment of the present disclosure, a computer program product is configured to serve a machine having a plurality of motorized devices that each include a motor having common operating characteristics. The computer program product includes a motor exchange module configured to assist in a motor exchange of an exchanged motor of at least one of the plurality of motorized devices with an exchange motor. The product also compares operating characteristic data of the exchanged motor with operating characteristic data of the exchange motor to determine exchange success, and associates and records the operating characteristic data of the exchange motor with an address of the at least one of the plurality of motorized devices.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, FIGS. 1-8 describe various embodiments of a machine having multiple motors and a system of the machine configured to assist in the exchange of motors.

Figure 1:
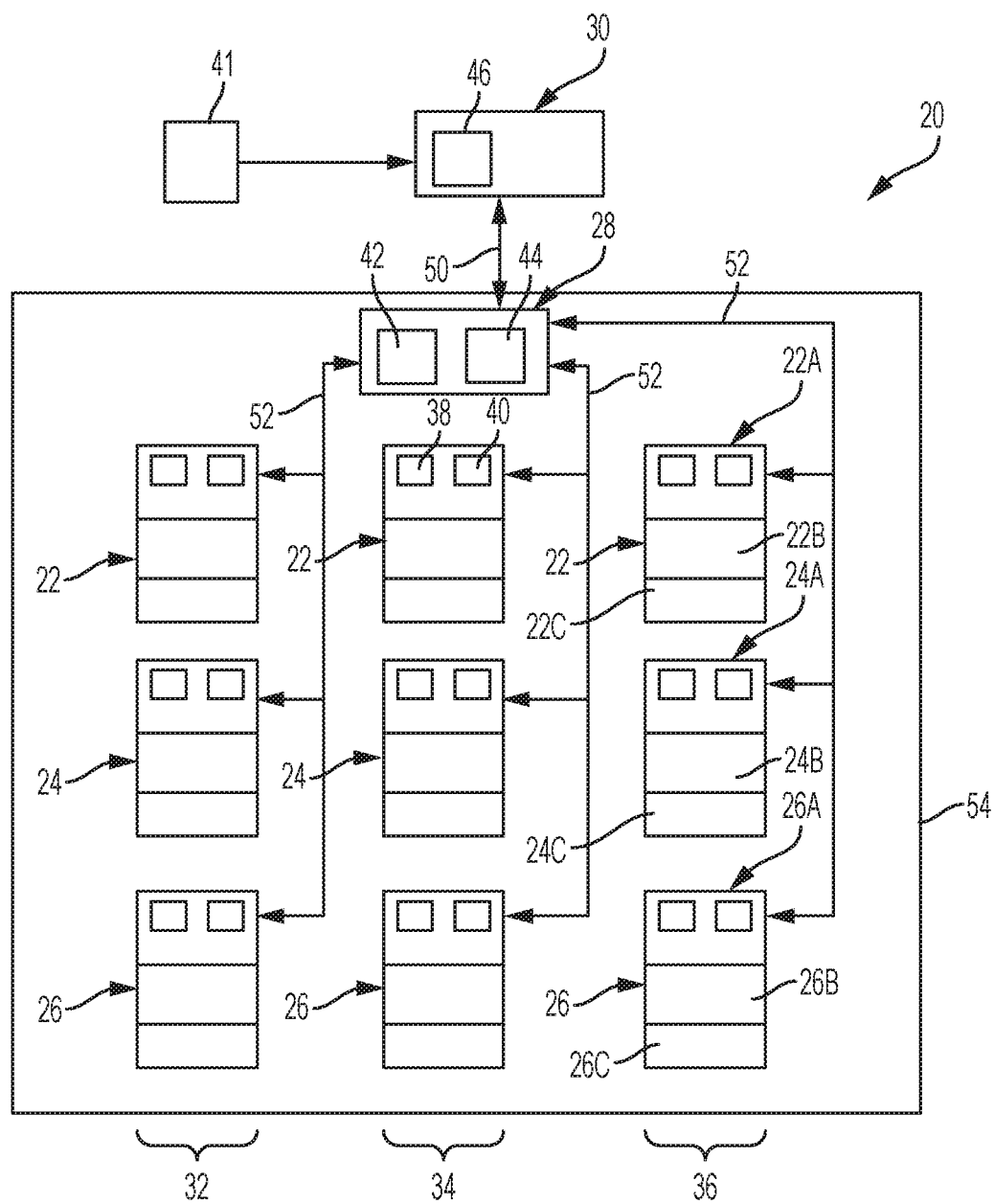
FIG. 1 is a schematic of a machine in accordance with the present disclosure.

Referring to FIG. 1, a machine 20 may include at least one first motorized device 22, at least one second motorized device 24, at least one third motorized device 26, a master controller 28, and a user interface 30. The motorized devices 22, 24, 26 may each serve separate and distinct functions toward overall operation of the machine 20. The motorized devices 22, 24, 26 may generally be distributed in at least one row (i.e., three illustrated as 32, 34, 36) with each row having a motorized device 22, a motorized device 24, and a motorized device 26. It is contemplated and understood that some examples of a machine may have only one motorized device or greater than three motorized devices.

The motorized device 22 may include a controller 22A, an electric motor 22B that may be brushless, and an actuator 22C that may be mechanical. The motorized device 24 may include a controller 24A, an electric motor 24B that may be brushless, and an actuator 24C that may be mechanical. The motorized device 26 may include a controller 26A, an electric motor 26B that may be brushless, and an actuator 26C that may be mechanical. Each motor 22B, 24B, 26B may be the same type of motor having the same or similar manufacturer specifications (i.e., same rated horse power, same rated speed, etc.). However, through wear and/or manufacturing tolerances the motors 22B, 24B, 26B, and/or a new replacement motor for use in any of the motorized devices 22, 24, 26, may have different operating characteristics. The differing operating characteristics may be associated with such factors as electrical coil resistance, magnetic strength, commutation sensor attributes, and others. In one, non-limiting, embodiment, the motors 22B, 24B, 26B may be three-phase brushless motors.

Each controller 22A, 24A, 26A of the respective motorized devices 22, 24, 26 may include a computing processor 38 (e.g., microprocessor) and a storage medium 40 that may be computer writeable and readable. The controllers 22A, 24A, 26A may store operating parameters of the respective motors 22B, 24B, 26B, operating characteristics of the respective motors 22B, 24B, 26B, operating parameters of the respective actuators 22C, 24C, 26C, maintenance history, operation history, and other data. Data may be collected automatically through execution of software, may be pre-programmed into the storage mediums 40, and/or may be entered by a user via the user interface and assistance via use of any variety of electronic readers 41 (e.g., bar code reader).

Similarly, the master controller 28 may include a computing processor 42 (e.g., microprocessor) and a storage medium 44 that may be computer writeable and readable. In one embodiment, the master controller 28 is configured to handle higher order tasks relative to the controllers 22A, 24A, 26A. In one embodiment, the user interface 30 may communicate directly with the master controller 28, that in-turn communicates with the controllers 22A, 24A, 26A. For example, the user interface 30 may display user prompts commanded by the master controller 28, and through the user interface, the master controller 28 may assist a user in the use of the reader 41 and downloading of data therefrom. The user interface 30 may include a display screen 46 that may be interactive for conveying information, and/or prompting a user to make various selections.

A communication pathway 50 may extend between the master controller 28 and the user interface 30, and may be hardwired or wireless. In one embodiment, the user interface 30 may be an integral part of the master controller 28 (i.e., physically located with the master controller 28). In another embodiment, the user interface 30 may be mobile (e.g., tablet, smart phone, and others).

Communication pathways 52 may extend between the master controller 28 and each controller 22A, 24A, 26A, and may be hardwired or wireless. In one embodiment, the master controller 28 and the motorized devices 22, 24, 26 may be mounted to a common support structure 54 of the machine 20 and the pathways 52 may thus be hardwired for robust communications. It is further contemplated and understood that other configurations of the controllers 22A, 24A, 26A, 28 are plausible. For example, the master controller 28 may be configured to include the functions of the controllers 22A, 24A, 26A. Alternatively, each row 32, 34, 36 may generally include only one, respective, controller configured to control the functions and store various parameters of the devices 22, 24, 26 for the respective row.

In one, non-limiting, embodiment, the machine 20 may be an agricultural planter (i.e., farming equipment). As an agricultural planter, the first motorized device 22 may be a down force device, the second motorized device 24 may be a seed plate device, and the third motorized device 26 may be a seed depth device. In one example, the motors 22B, 24B, 26B may be the same model type as previously described. However, the actuators 22C, 24C, 26C may be different from one-another performing different functions, thus having different operating parameters controlled by the respective controllers 22A, 24A, 26A. It is understood that such devices including the associated actuators are commonly known by one having skill in the art of agricultural planters.

Figure 2:
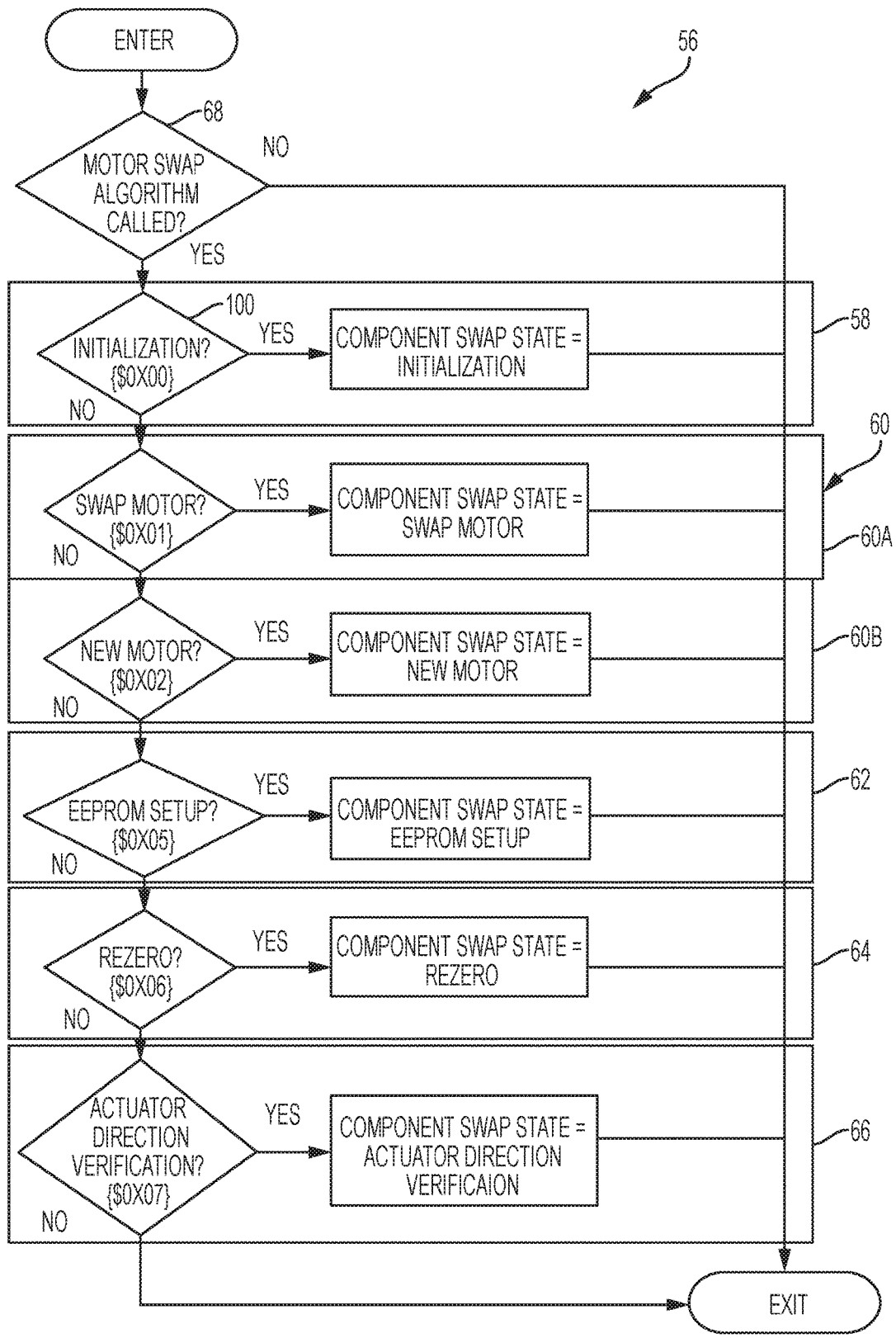
FIG. 2 is a schematic of a motor exchange system of the machine.

Referring to FIG. 2, the machine 20 may include an electric motor exchange system 56 that may at least in-part be software-based and may further include an algorithm. The motor exchange system 56 may be configured to support the exchange of an existing motor (i.e., motor 22B, 24B, or 26B) that may be deemed defective, with a new motor or with a used motor taken from another site (i.e., address) of the machine 20. The system 56 may further be configured to store the operating characteristic data of each motor 22B, 24B, 26B at the respective controller 22A, 24A, 26A, and transfer or associate the operating characteristic data to the new address as a result of an exchange. The motor exchange system 56 may include, or is supported by, the reader 41, the user interface 30, and the controllers 22A, 24A, 26A, 28.

In one operating scenario of the motor exchange system 56, an existing motor (i.e., exchanged motor) may be defective and may thus require replacement with a new motor (i.e., exchange motor). To establish the operating characteristics of the new motor, the new motor may go through diagnostic testing. Once the new operating characteristic data is known, it may be recorded directly on the new motor (e.g., a coded tag). This data may be machine readable by the reader 41 for future downloading into an associated controller, if and when use of the new motor is required.

For simplicity of explanation, and by way of example, the machine 20 will now be described in terms of the agriculture planter 20 previously described, but it is understand that the same principles may be applied to any machine. As one, non-limiting example, the planter 20 may be configured to allow a user to install a new motor into the down force device 22, allow a user to install a new motor into the seed plate device 24, allow the user to install a new motor into the seed depth device 26, allow a user to swap a seed plate motor 24B into a down force device 22, allow a user to swap a down force motor 22B into a seed plate device 24, allows the user to re-zero the associated devices after a motor exchange, and ensures that the devices 22, 24, 26 are ready for use after the motor exchange.

The motor exchange system 56 of the planter 20 may include an initialization module 58, a motor exchange module 60, a memory setup module 62 (e.g., EEPROM setup module), a re-zero module 64, and a drive direction module 66. In operation of the motor exchange system 56, a user may first initiate (see block 68 in FIG. 2) the system via the user interface 30. Upon system initiation, the initialization module 58 may be executed. Upon initialization, the system 56 may execute the motor exchange module 60. In general and upon execution, one of a swap motor sub-module 60A and a new motor sub-module 60B of the motor exchange module 60 may be executed depending upon the user activity or needs (i.e., swapping motors or installing a new motor). After the motor exchange module 60, the system 56 may execute the memory setup module 62 to store at least the motor operating characteristics into the associated controller 22A, 24A, 26A. After execution of the re-zero module 64, the system 56 may execute the drive direction module 66 to confirm the associated device is operating in the correct direction, and if not, correct the direction. It is contemplated and understood that the execution order of the modules may occur differently than described above.

Figure 3:
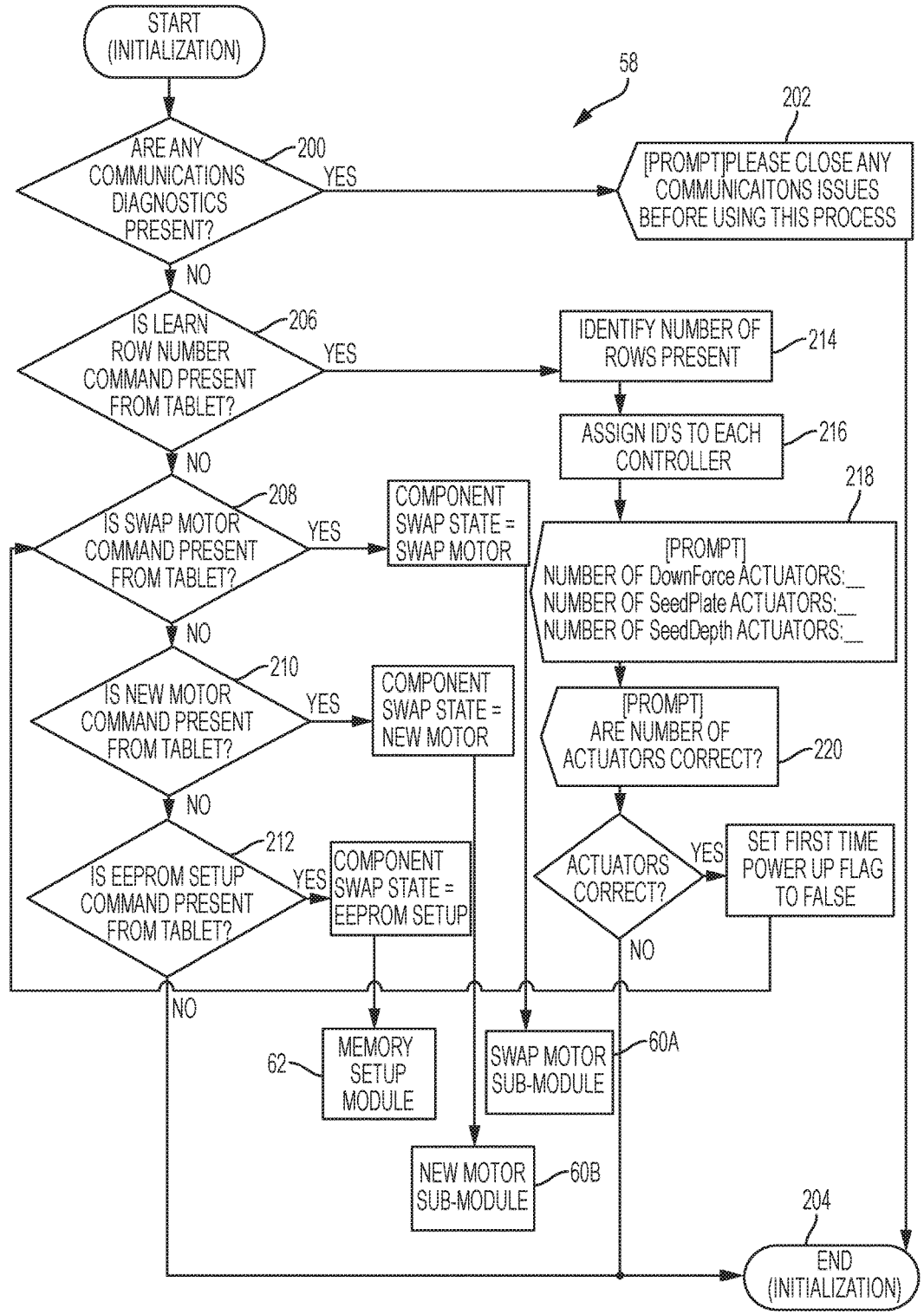
FIG. 3 is a schematic of an initialization module of the motor exchange system.

Referring to FIGS. 2 and 3, the initialization module 58 of the motor exchange system 56 may be configured to self-initiate and generally runs in the background. That is, the initialization module 58 may not require an initiation command made by a user via the user interface 30. At block 100 (see FIG. 2), the motor exchange system 56 may self-determine if an initialization has not yet occurred. If "yes", the system progresses to the initialization module 58. If "no", the system may advance to the swap motor module 60.

Referring to FIG. 3, the initialization module 58 may initiate when an associated controller(s) 22A, 24A, 26A, 28 are first powered-up. When initiated, the initialization module 58 is configured to learn the state of the entire planter 20. That is, the module 58 may learn the layout of all of the motorized devices 22, 24, 26. In one scenario, the initialization module 58 may not have to learn much, or may not have to learn anything, if the layout (e.g., size, characteristics, diagnostics, and others) is already preprogrammed into the master controller 28. The initialization module 58 may also provide a way of programming an aspect of the master controller 28.

When operating and at block 200, the initialization module 58 may determine if any communication diagnostics are present (i.e., running). At block 202, and if "yes" to block 200, the initialization module 58 may cause a user prompt. The user prompt may be displayed, for example, on the screen 46 of the user interface 30, and may instruct the user to close any communication issues before proceeding with initialization. At block 204, the initialization may then end or terminate.

At block 206 and if the answer to block 200 is "no", the initialization module 58 may determine if a command is present from the user interface 30 to learn the row number (i.e., three rows 32, 34, 36 in the present example). At block 208 and if the answer to block 206 is "no", the initialization module 58 determines if a swap motor command is present from the user interface 30. At block 210 and if the answer to block 208 is no, the initialization module 58 determines if a new motor command is present from the user interface 30. At block 212 and if the answer to block 210 is "no", the initialization module 58 determines if a memory setup command is present from the user interface 30. At block 214 and if the answer to block 212 is "no", the initialization module 58 terminates (see block 204).

If "yes" to block 206, and at block 214, the user may then identify the number of rows present via the user interface 30. At block 216, the initialization module 58 may then assign identifications (i.e., addresses) to all of the controllers 22A, 24A, 26A of all of the rows 32, 34, 46. At block 218, the user may then be prompted, via the user interface 30 to, for example: enter the number of down force devices 22; enter the number of seed plate devices 24; and enter the number of seed depth devices 26. At block 220 and in case of, for example, user error, the initialization module 58 may determine if the number of devices entered is correct. If "no", the initialization module 58 may terminate initialization (see block 204). In an alternative embodiment and if "no", the initialization module 58 may return to block 214. If "yes", the initialization module 58 may progress to block 208.

At block 208 and if the user initiates a swap motor command, the motor exchange system 56 may advance to the swap motor submodule 60A. If the answer to block 208 is "no", the initialization module 58 may advance to block 210. If the user initiates a new motor command at block 210, the motor exchange system 56 may advance to the new motor submodule 60B. If the answer to block 210 is "no", the initialization module 58 may advance to block 212. If the user initiates a memory setup command at block 212, the motor exchange system 56 may advance to the memory setup module 62.

Figure 4A:
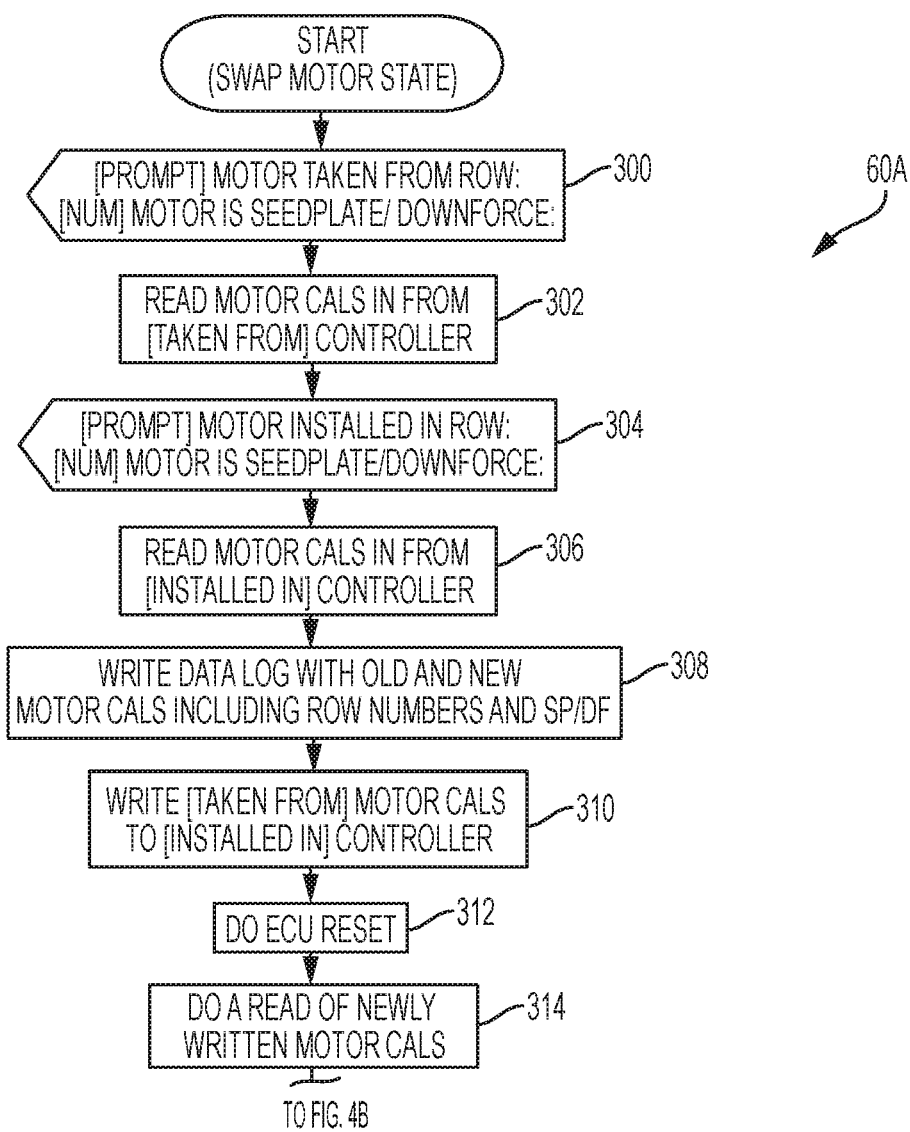
FIGS. 4A and 4B are schematics of a swap motor sub-module of the motor exchange system.
Figure 4B:
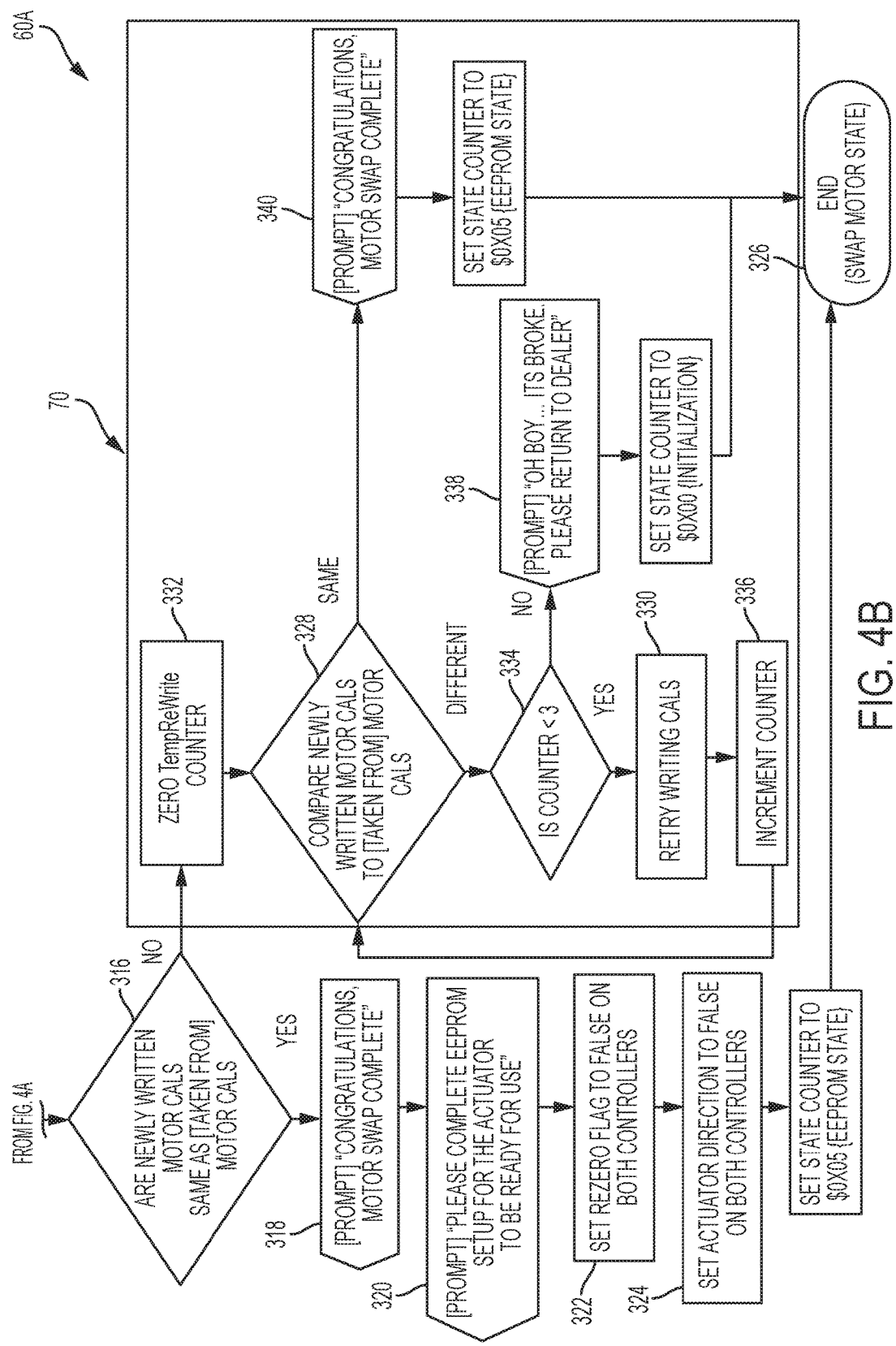

Referring to FIGS. 4A and 4B, the swap motor submodule 60A generally supports the taking of one motor that is already being used in any one of the devices 22, 24, 26, and places the motor (i.e., the "taken motor") into another device 22, 24, 26. At block 300, the swap motor submodule 60A may prompt the user, via the screen 46 of the user interface 30, to enter the previous address (i.e., location) of the taken motor. This address may entail entering the associated row, and entering the motorized device type (i.e., down force device 22, seed plate device 24, or seed depth device 26). At block 302, the operating characteristics of the taken motor that may be stored in the controller at the previous address may then be read by the controller (e.g., master controller 28). At block 304, the user may be prompted, via the user interface 30, to enter the new address (e.g., row number and device type) associated with the motor being replaced.

At block 306, the operating characteristics data of the taken motor (i.e., exchange motor) may then be read into the master controller 28, which may then communicate the data to the controller associated with the device needing motor replacement. That is, the swap motor submodule 60A may cause the device controllers to communicate with one another. This communication may occur directly between device controllers 22A, 24A, 26A, or may be managed through the master controller 28. The reading and transfer of the operating characteristics may occur without user intervention. At block 308, the motor exchange system 56 may create a data log associated with the old (i.e., replaced) and new (i.e., taken) motor operating characteristics data and associated addresses. At block 310, the taken motor operating characteristics data and the replaced motor operating characteristics data are written into the device controller of the device receiving the taken motor.

At block 312, the device controller receiving the taken motor is reset to address any memory rights. That is, the device controller(s) may write to memory on shutdown of, for example, the machine 20. This initializes a shutdown sequence that allows a memory write to occur. At block 314, the newly written motor operating characteristics data of the taken motor are read. At block 316, the newly written motor operating characteristics data is compared to the operating characteristics data of the replaced motor. That is, the swap motor submodule 60A may perform this comparison in the background without user intervention. At block 318, if the newly written motor operating characteristics data is generally the same as the operating characteristics data of the replaced motor, the swap motor submodule 60A may cause a user prompt, via the user interface 30, that notifies the user of a successful motor swap.

At block 320, the swap motor submodule 60A may cause another user prompt that instructs the user to complete the memory setup for at least the motorized device that has just received the taken motor. At block 322, a re-zero flag is set to false on the controller of the motorized device that has given-up the taken motor and the controller of the motorized device that received the taken motor. The "false" setting of the re-zero flag is indicative of the motor exchange system 56 not yet executing the re-zero module 64. Similarly, and at block 324, a driving direction flag may be set to false for both device controllers. The "false" setting of the driving direction flag is indicative of the motor exchange system 56 not yet executing the driving direction module 66. At block 326, the swap motor submodule 60A may then terminate.

The swap motor submodule 60A may further include a diagnostic routine 70 that is configured to attempt a correction if the answer to block 316 is "no". That is, a facet of the motor exchange system 56 is that the operating characteristic data of the taken motor should be generally the same as the operating characteristics data of the replaced motor. If this is not the case, the diagnostic routine 70 may attempt a correction or clarification. As indicated by block 328, the diagnostic routine 70 may attempt another comparison of the newly written motor operating characteristic data to the old motor operating characteristic data. At block 330, if the data does not compare, the diagnostic routine may attempt a rewrite of the data sets. At blocks 332, 334, 336, this attempt at rewrites may include multiple attempts. At block 338 and if the number of rewrite attempts exceed a predefined number (e.g., three illustrated), the diagnostic routine 70 may cause a user prompt that notifies the user of a problem with the system 56, and the motor swap submodule 60A may then terminate (see block 326).

If after performing block 328, the two data sets are deemed to be about the same, at block 340 the diagnostic routine 70 may cause a user prompt that notifies the user that the motor swap is complete and/or successful, and the swap motor submodule 60A may then terminate (see block 326).

Figure 5A:
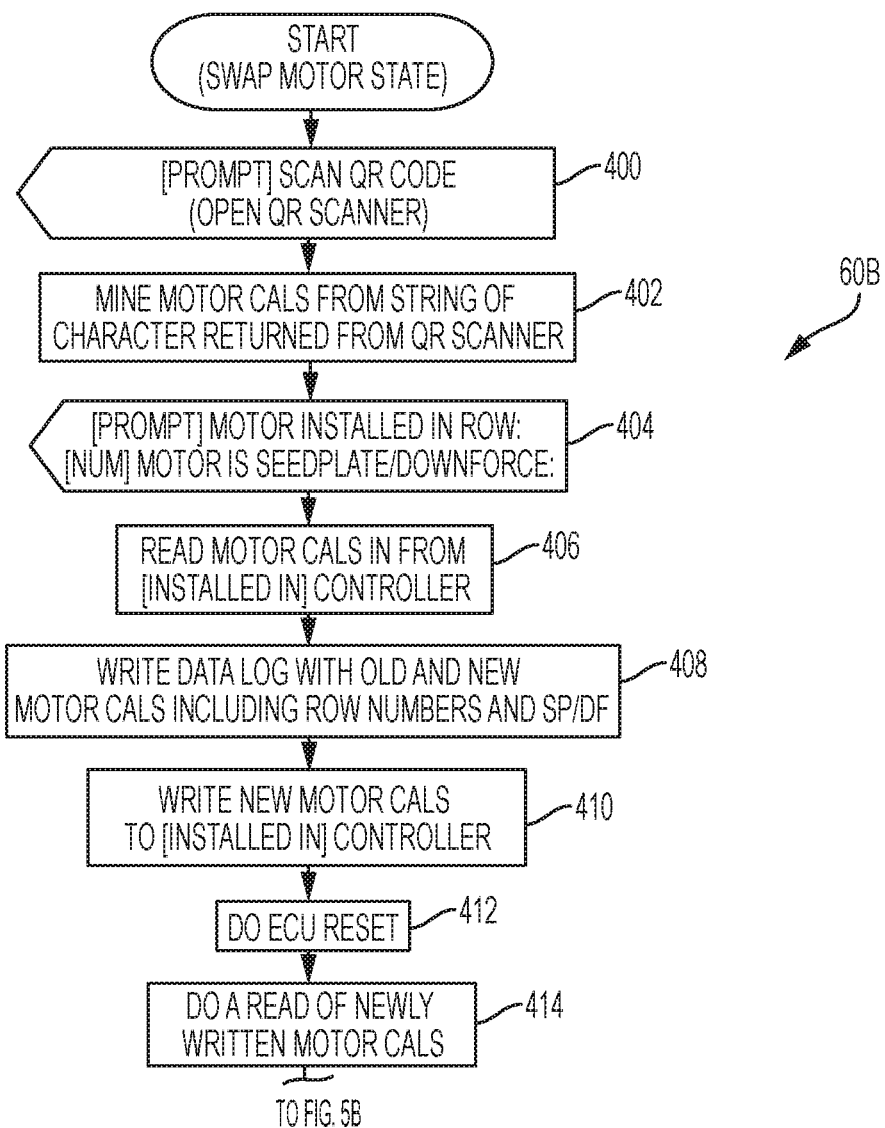
FIGS. 5A and 5B are schematics of a new motor sub-module of the motor exchange system.
Figure 5B:
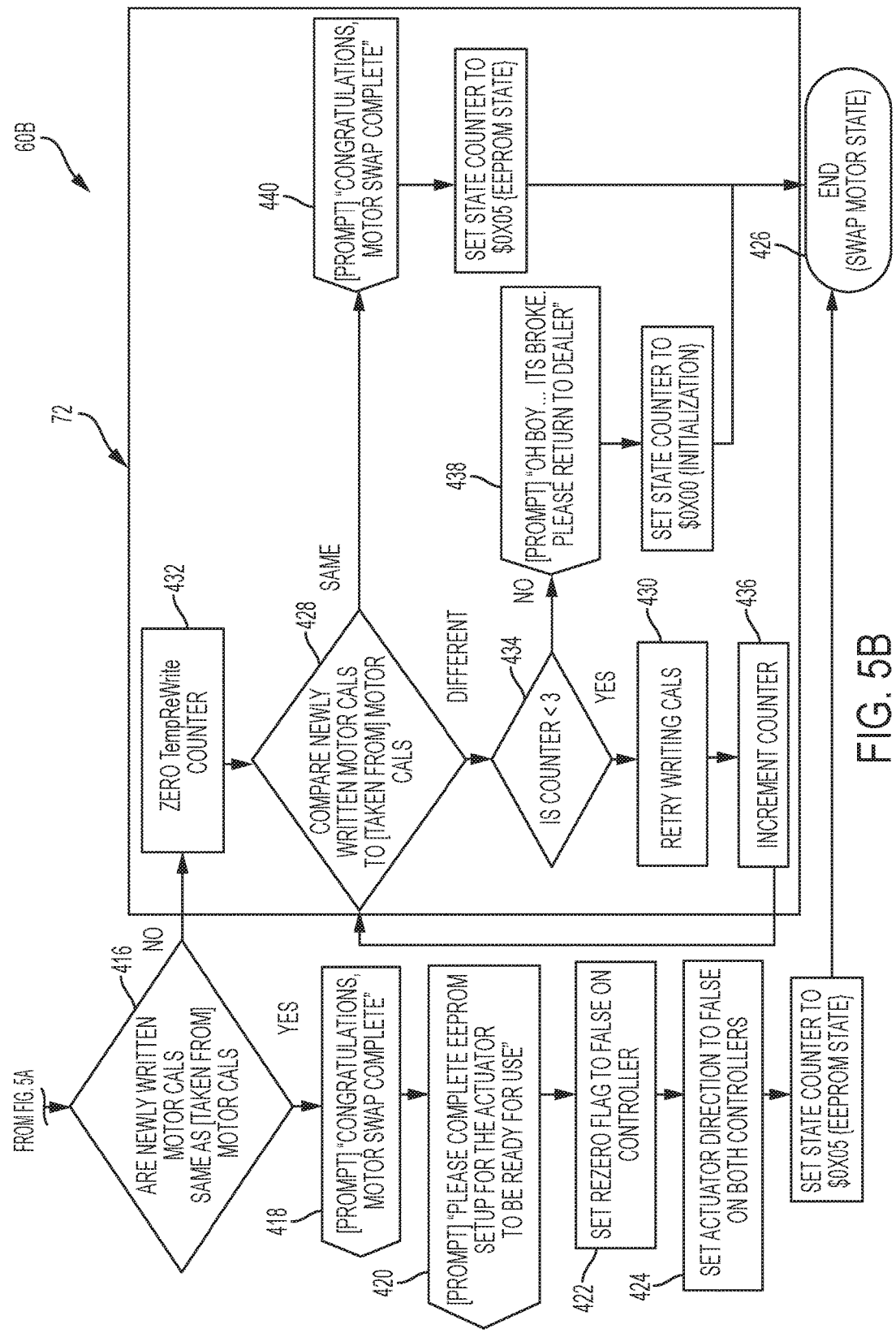

Referring to FIGS. 5A and 5B, the new motor submodule 60B generally supports the replacement of a motor used in one of the motorized devices 22, 24, 26 with a new motor (i.e., not previously used on the agricultural planter 20). At block 400, the new motor submodule 60B may prompt the user, via the screen 46 of the user interface 30, to use the reader 41 to read a machine-readable code (e.g., Quick Response (QR) code) that may be displayed on the new motor. At block 402, operating characteristics data of the new motor may be mined from a string of characters.

At block 404, the user may be prompted, via the user interface 30, to enter the new address (e.g., row number and device type) associated with the motor being replaced. At block 406, the operating characteristics data of the new motor may then be read into the master controller 28, which may then communicate the data to the device controller associated with the device needing motor replacement. The reading and transfer of the operating characteristics may occur without user intervention. At block 408, the motor exchange system 56 may create a data log associated with the replaced motor and the new motor operating characteristics data and associated addresses. At block 410, the new motor operating characteristics data and the replaced motor operating characteristics data may be written into the device controller of the device receiving the new motor.

At block 412, the device controller receiving the new motor is reset to address any memory rights. That is, the device controller(s) may write to memory on shutdown of, for example, the machine 20. This initializes a shutdown sequence that allows a memory write to occur. At block 414, the newly written motor operating characteristics data of the new motor is read. At block 416, the newly written motor operating characteristics data is compared to the operating characteristics data of the replaced motor. That is, the new motor submodule 60B may perform this comparison in the background without user intervention. At block 418, if the newly written motor operating characteristics data is generally the same as the operating characteristics data of the replaced motor, the new motor submodule 60B may cause a user prompt, via the user interface 30, that notifies the user of a successful motor exchange.

At block 420, the new motor submodule 60B may cause another user prompt that instructs the user to complete the memory setup for at least the motorized device that has just received the new motor. At block 422, a re-zero flag is set to false on the controller of the motorized device that received the new motor. The "false" setting of the re-zero flag is indicative of the motor exchange system 56 not yet executing the re-zero module 64. Similarly, and at block 324, a driving direction flag may be set to false for the device controller. The "false" setting of the driving direction flag is indicative of the motor exchange system 56 not yet executing the driving direction module 66. At block 426, the new motor submodule 60B may then terminate.

The new motor submodule 60B may further include a diagnostic routine 72 that is configured to attempt a correction if the answer to block 416 is "no". That is, a facet of the motor exchange system 56 is that the operating characteristic data of the new motor should be generally the same as the operating characteristics data of the replaced motor. If this is not the case, the diagnostic routine 72 may attempt a correction or clarification. As indicated by block 428, the diagnostic routine 70 may attempt another comparison of the newly written motor operating characteristic data to the old motor operating characteristic data. At block 430, if the data does not compare, the diagnostic routine may attempt a rewrite of the data sets. At blocks 432, 434, 436, this attempt at a rewrite may include multiple attempts. At block 438 and if the number of rewrite attempts exceed a predefined number (e.g., three illustrated), the diagnostic routine 72 may cause a user prompt that notifies the user of a problem with the system 56, and the new motor submodule 60B may then terminate (see block 426).

If after performing block 428, the two data sets are deemed to be about the same, at block 440 the diagnostic routine 72 may cause a user prompt that notifies the user that the motor exchange is complete and/or successful, and the new motor submodule 60B may then terminate (see block 426).

Figure 6A:
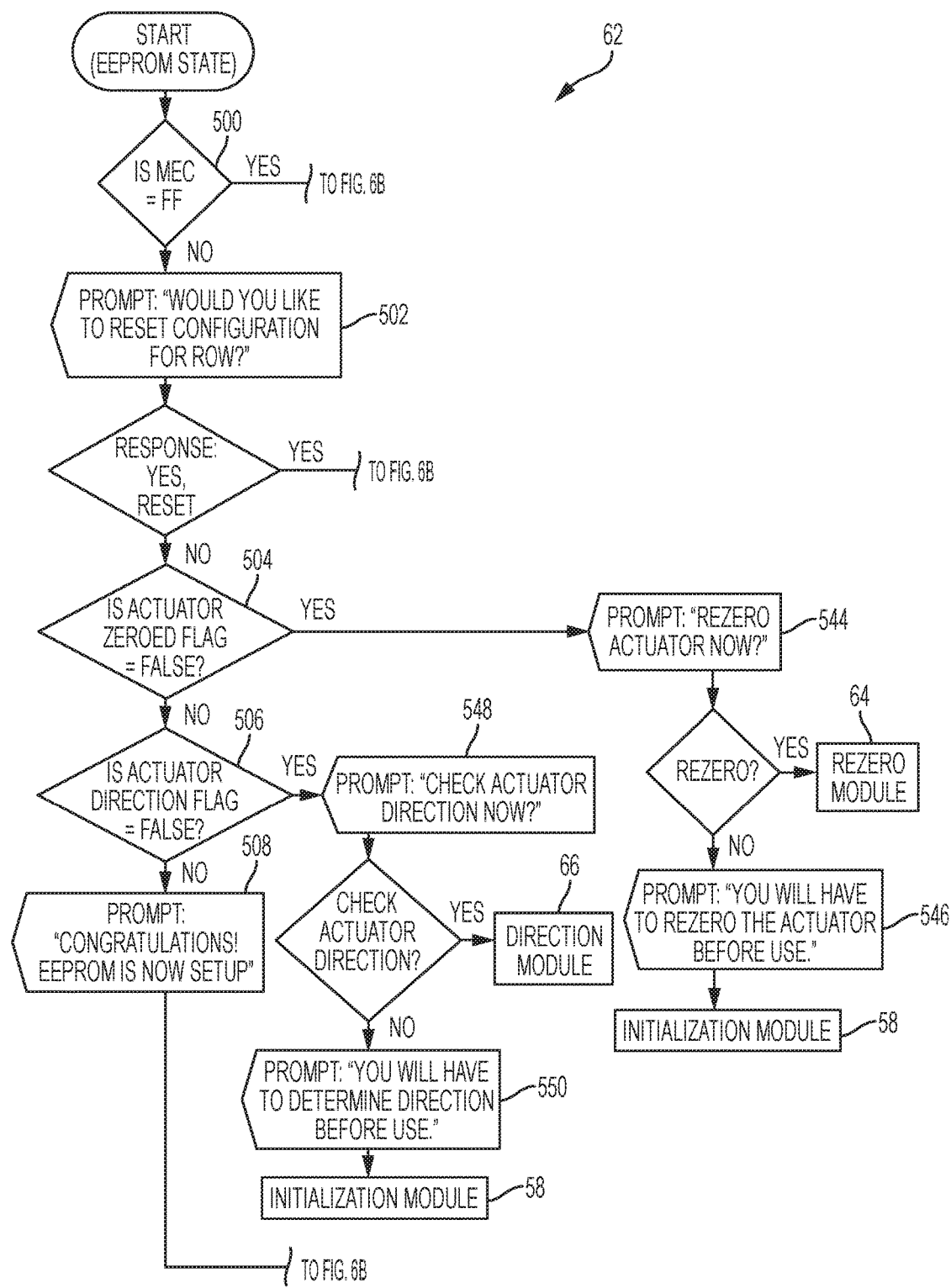
FIGS. 6A and 6B are schematics of a memory setup module of the motor exchange system.
Figure 6B:
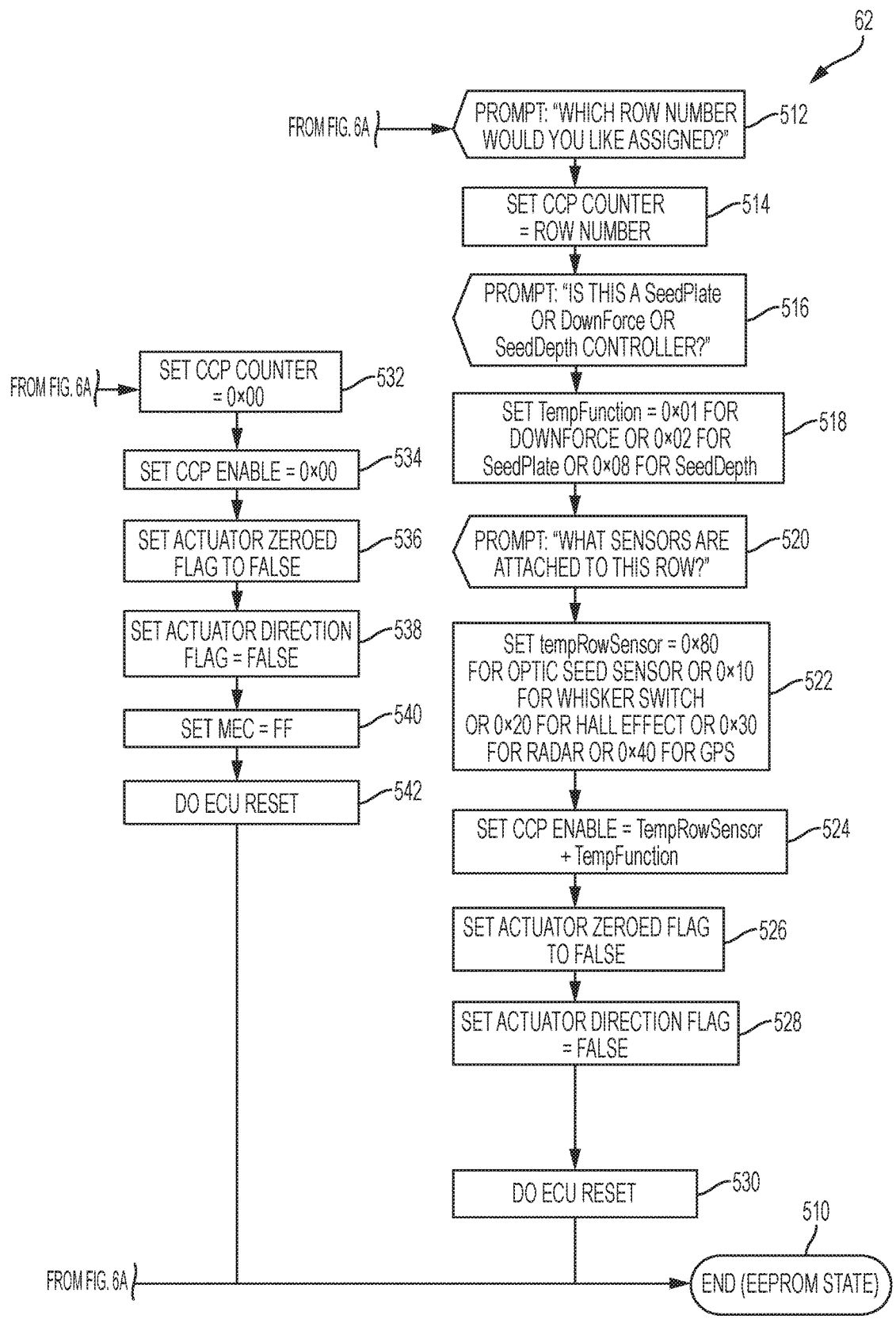

Referring to FIGS. 6A and 6B, the memory setup module 62 (e.g., EEPROM setup module) of the motor exchange system 56 is configured to reset, for example, the system configuration and/or layout. For example, if the original location of a swapped motor is not replaced, the motor exchange system 56 is capable of reconfiguring to reflect this omission. In addition, if the wrong reconfiguration information is entered by a user, the memory setup module 62 facilitates the ability to fix the error.

At block 500, the memory setup module 62 inquiries whether the exchange motor (i.e., new or taken motor) has ever 'not' been used or configured. If "no" and at block 502, the memory setup module 62 may prompt the user asking whether the user wants to reset the configuration for an address. For example, the memory setup module 62 may ask the user if he/she would like to reset the configuration for a row. If the user replies "no" and at block 504, the memory setup module 62 may determine whether a device re-zero flag is false. If "no" (i.e., not false), this is indicative that re-zeroing of the motorized device was previously accomplished, and the module advances to block 506. At block 506, the memory setup module 62 may determine whether a driving direction flag is false. If "no", this is indicative that driving direction of the motorized device was previously accomplished, and the module 62 may advance to block 508. At block 508, the memory setup module 62 may prompt the user, via the user interface 30, and inform the user that the memory is now setup. After the prompt and at block 510, the memory setup module may then terminate.

Returning to block 500 and if the exchange motor has not been previously used or configured the memory setup module 62 advances to block 512. At block 512, the module 62 may prompt the user, via the user interface 30, asking which address would you like the exchange motor to be assigned to. In one example, a component of the address may be a row. At block 514, the memory setup module 62 may store the user selected row. At block 516, the module 62 may prompt the user, asking the type of the motorized device 22, 24, 26 as yet another component of the device address. At block 518 and depending upon the user selected type of motorized device, the memory setup module may store a particular function.

In one example and at block 520, the memory setup module 62 may prompt the user to determine what sensors are associated with what row. Examples of sensors may include ground speed sensors, optic sensors, and others that may service one or multiple motorized devices. At block 522, the memory setup module 62 may determine which sensor is associated with which motorized device once the user assigns the appropriate rows. At block 524, the memory setup module 62 associates particular operating functions to associated or attached sensors.

At block 526, the memory setup module 62 may set a device re-zeroed flag to false indicating that the re-zero module 64 should still be executed. At block 528, the module 62 may set a driving direction flag to false indicating that the driving direction module 66 should still be executed. At block 530, the right to write to memory is reset, and then the module 62 terminates at block 510.

At block 502 and if the user wants to reset a configuration for a row, the memory setup module 62 may advance to block 532. At block 532, the motorized device may be set to a non-useable, default state. The default state notifies the system that the device may not be functional in its current state. Therefore, notification of the default state may be one means of preventing damage to the device. At block 534, the module 62 may set a sensor and an associated motorized device with a function served by the sensor. At block 536, the module 62 may set a device re-zeroed flag to false. At block 538, the module 62 may set a driving direction flag to false. At block 540, the module 62 may generally inform the controller of the associated motorized device that the associated motor has not yet been configured. At block 542, the module 62 may save any resettings to the device controller, and the module 62 may then terminate (see block 510).

At block 504 and if the device re-zeroed flag is false, the memory setup module 62 may advance to block 544. At block 544, the user may be prompted, via the user interface 30, if the user desires to re-zero the device now. If the user chooses "yes", the motor exchange system 56 may advance to the re-zero module 64. If the user chooses "no", the module 62 may advance to block 546. At block 546, the user may be prompted by the module 62 wherein the user is notified that re-zeroing the device will be required before use. The motor exchange system 56 may then advance to the initialization module 58.

At block 506 and if the driving direction flag is false, the memory setup module 62 may advance to block 548, At block 548, the user may be prompted and asked if checking the driving direction is now desired. If "yes", the motor exchange module 56 advances to the driving direction module 66. If "no" and at block 550, the module 62 may notify the user that a determination of the driving direction of the device will be required before use, and the system 56 may then advance to the initialization module 58.

Figure 7A:
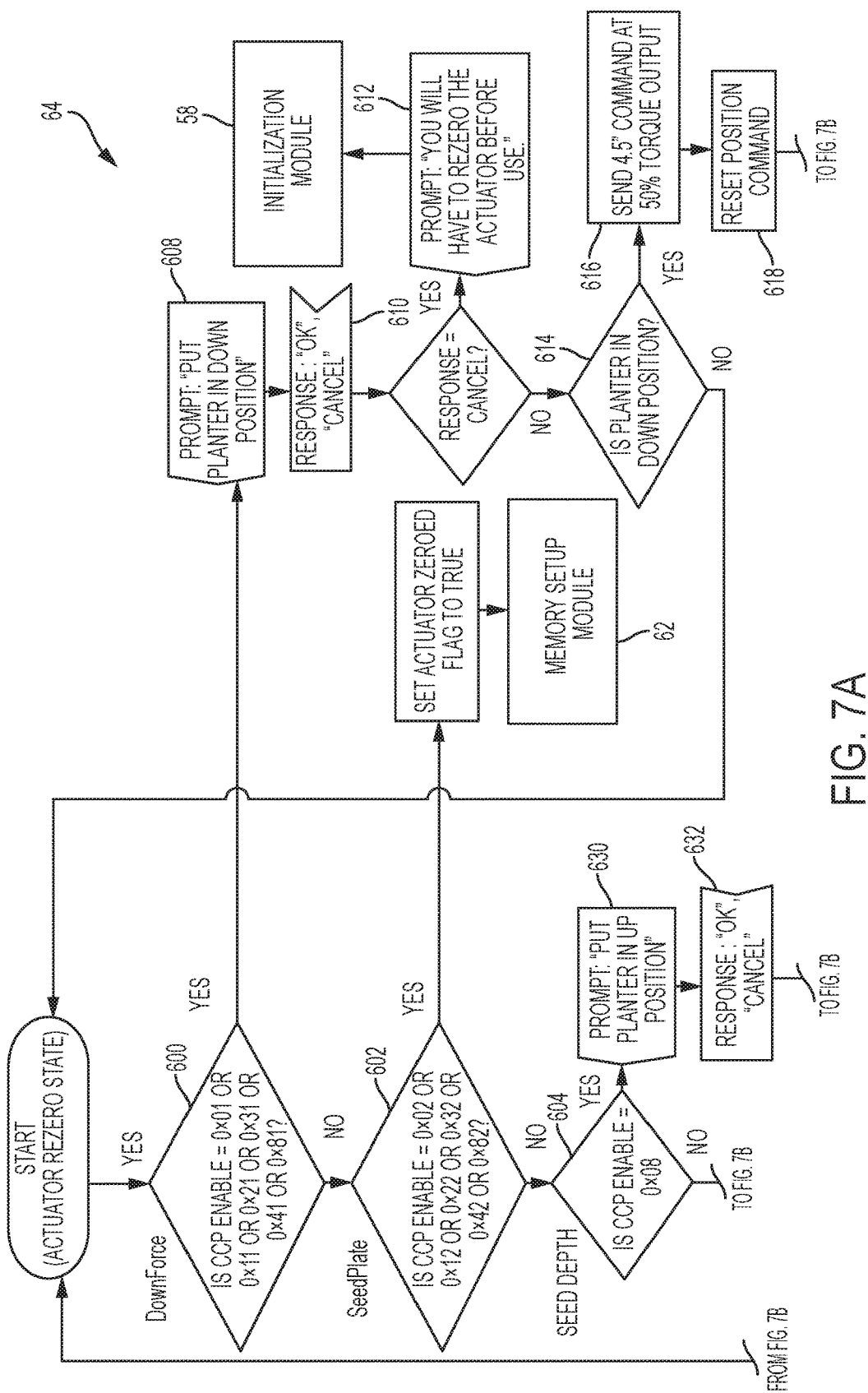
FIGS. 7A and 7B are schematics of a re-zero module of the motor exchange system.
Figure 7B:
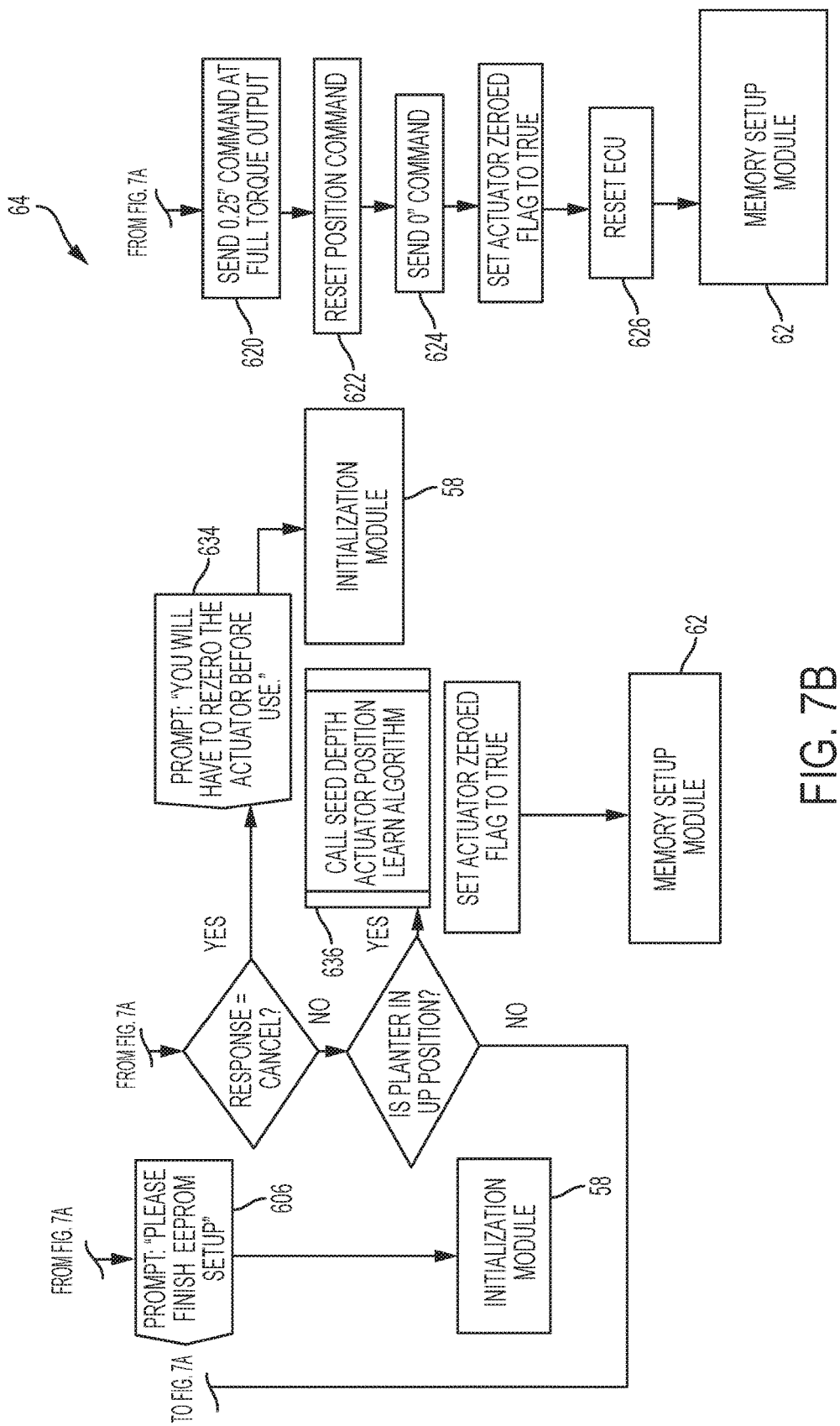

Referring to FIGS. 7A and 7B, the re-zero module 64 is generally configured to verify that the various actuators 22C, 24C, 26C are orientated in appropriate positions. Depending upon the type and functions of the various motorized devices 22, 24, 26, the configuration and/or routines of the module 64 may be different from one machine to the next. In the example of an agricultural planter 20 and at block 600, the module 64 may determine (i.e., the master controller 28 may ask the associated device controller) if a down force device 22 is out of position. If "no" and at block 602, the module 64 may determine (i.e., the master controller 28 may ask the associated device controller) if the device is a seed plate device 24. The module 64 may be preprogrammed to know that a seed plate device 24 does not need to be re-zeroed because the seed plate device simply continues to rotate in the same direction. If "no" and at step 604, the module 64 may determine (i.e., the master controller 28 may ask the associated device controller) if the device is a seed depth device 26. If "no" and at block 606, the module 64 may prompt the user, instructing the user to finish the memory setup. In general, block 606 provides the motor exchange system 56 with a means of exiting the re-zero module 64.

If "yes" to block 600 and at block 608, the user may be prompted by module 64 to place the down force device 22 in a specified position (e.g., down position). At block 610, the user may have the ability to confirm or cancel this instruction. At block 612 and if the user denies or cancels this instruction, the module 64 may prompt the user stating that the device will have to be re-zeroed before the device can be used, and the system 56 may advance to the initialization module 58.

If the user chooses to confirm the prompt expressed in block 608, and at block 614, the user may confirm and/or place the down force device 22 in the down position, or may choose not to do so. If the device 22 is not in the down position, is not placed in the down position by the user, and/or is not capable of moving into the down position, the module 64 may revert to block 600. Alternatively, and once the device 22 is confirmed to be in the down position, the module 64 may over-command the device 22 at block 616. For example, if the actuator stroke of device 22 is about 4 inches, the actuator may be commanded to move about 4.5 inches. At block 618, the module 64 may set the present location of the device 22 to zero. At block 620, the device 22 may be taken off of a hard stop by a pre-scribed distance (e.g., about 0.25 inches). At block 622, the position command is reset as a means of preventing the motor 22B from bottoming out the actuator 22C. At block 624, the module assures that the previous step is not repeated. At block 626, everything is saved to the local device controller 22A, and the system 56 advances to the memory setup module 62.

If "yes" with reference to block 602, the motor exchange system 56 may advance to the memory setup module 62.

If "yes" with reference to block 604, and at block 630, the re-zero module 64 may prompt the user, by instructing the user to place the agricultural planter 20 in an up position. At block 632, the user is provided the ability to cancel the instructions or confirm the instructions. If the user cancels the instructions and at block 634, the module 64 may prompt the user by informing the user that the device 26 must be re-zeroed before use, and the motor exchange system 56 may advance to the initialization module 58. If the user confirms the instructions but the agricultural planter 20 is not in the up position, the module 64 may return to start. If the user confirms the instructions and the agricultural planter 20 is in, or is placed in, the up position, the module 64 progresses to block 636. At block 636, a seed depth device position algorithm is applied, and the motor exchange system 56 advances to the memory setup module 62.

Figure 8A:
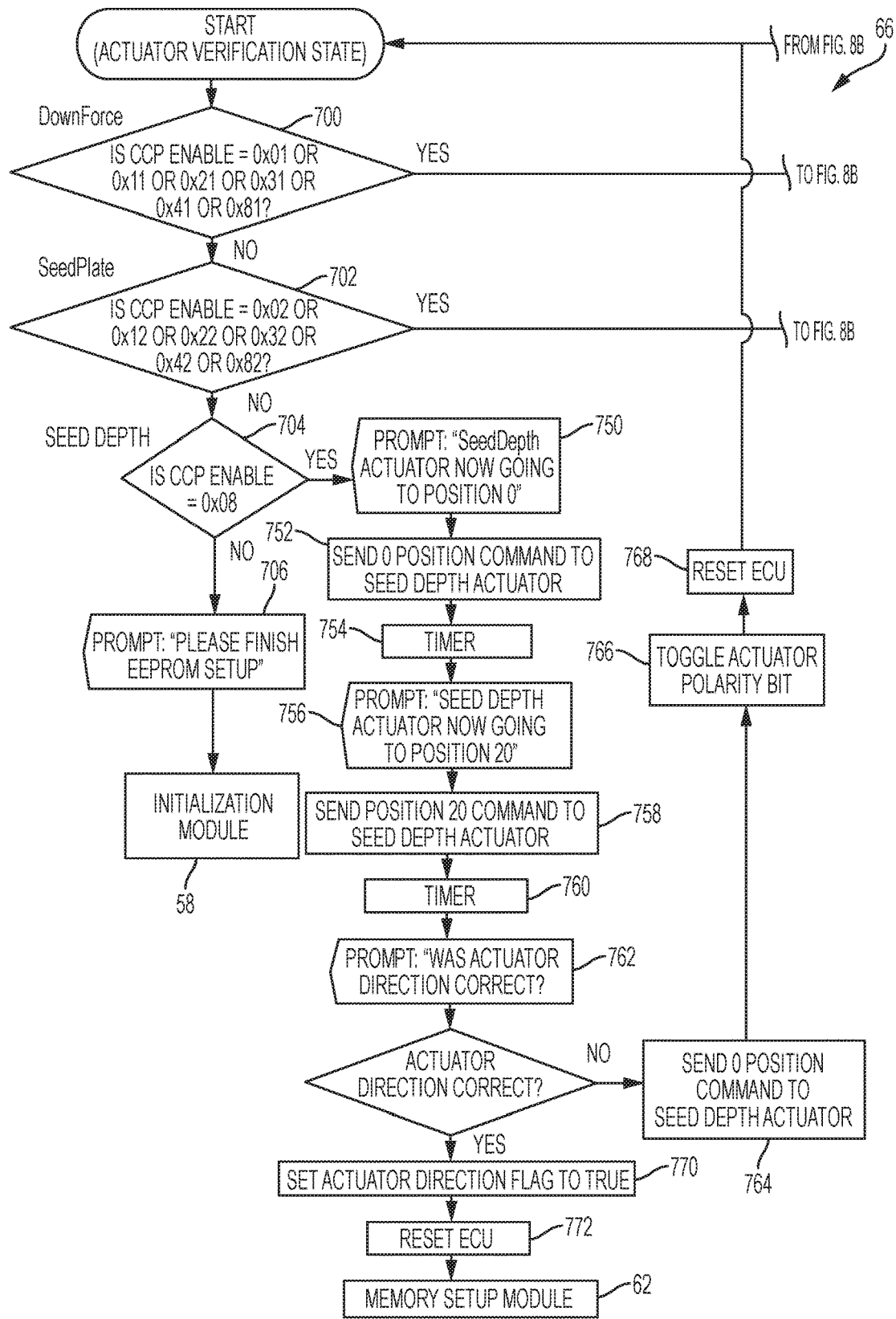
FIGS. 8A, 8B, and 8C are schematics of a driving direction module of the motor exchange system.
Figure 8B:
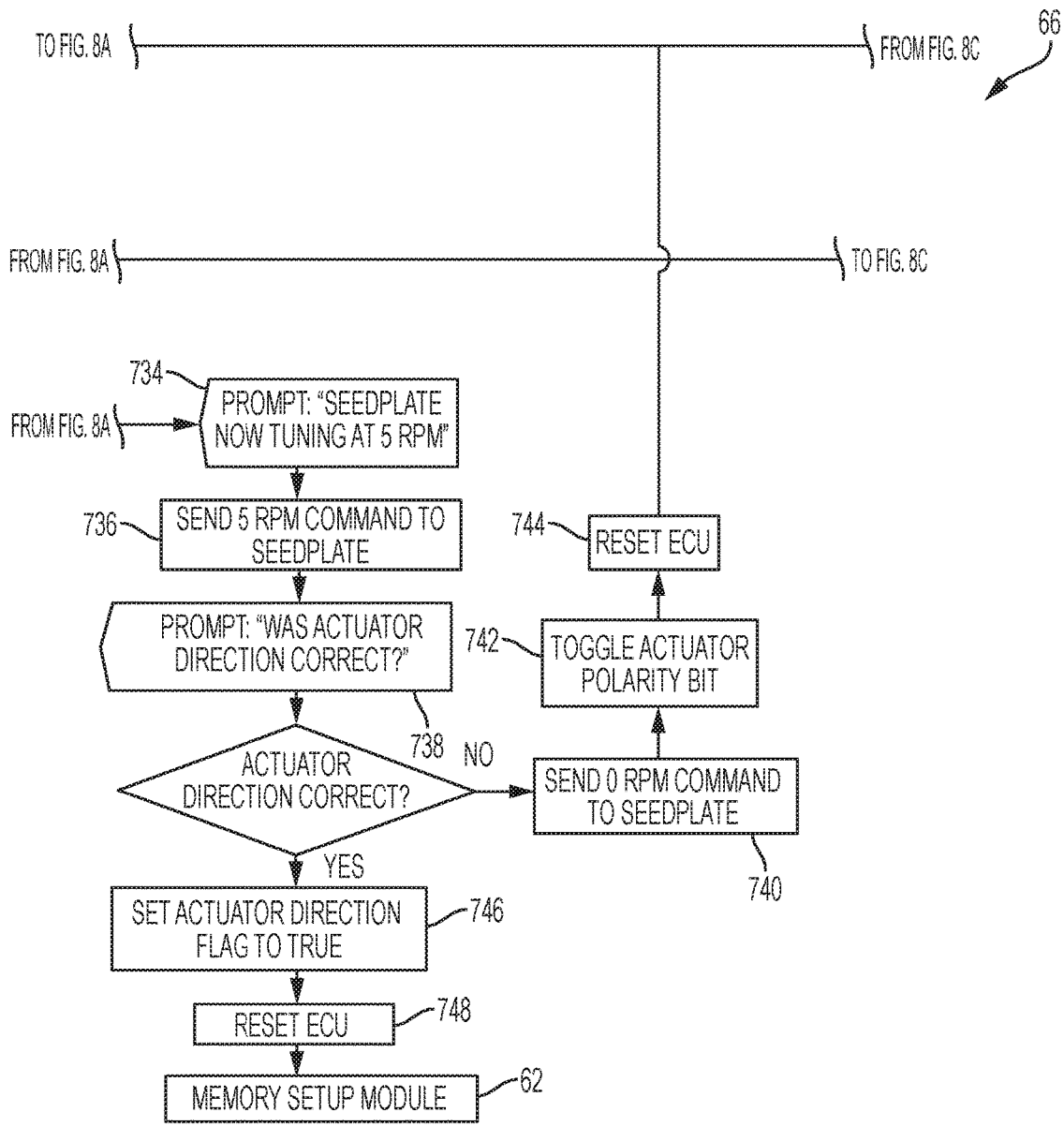
Figure 8C:
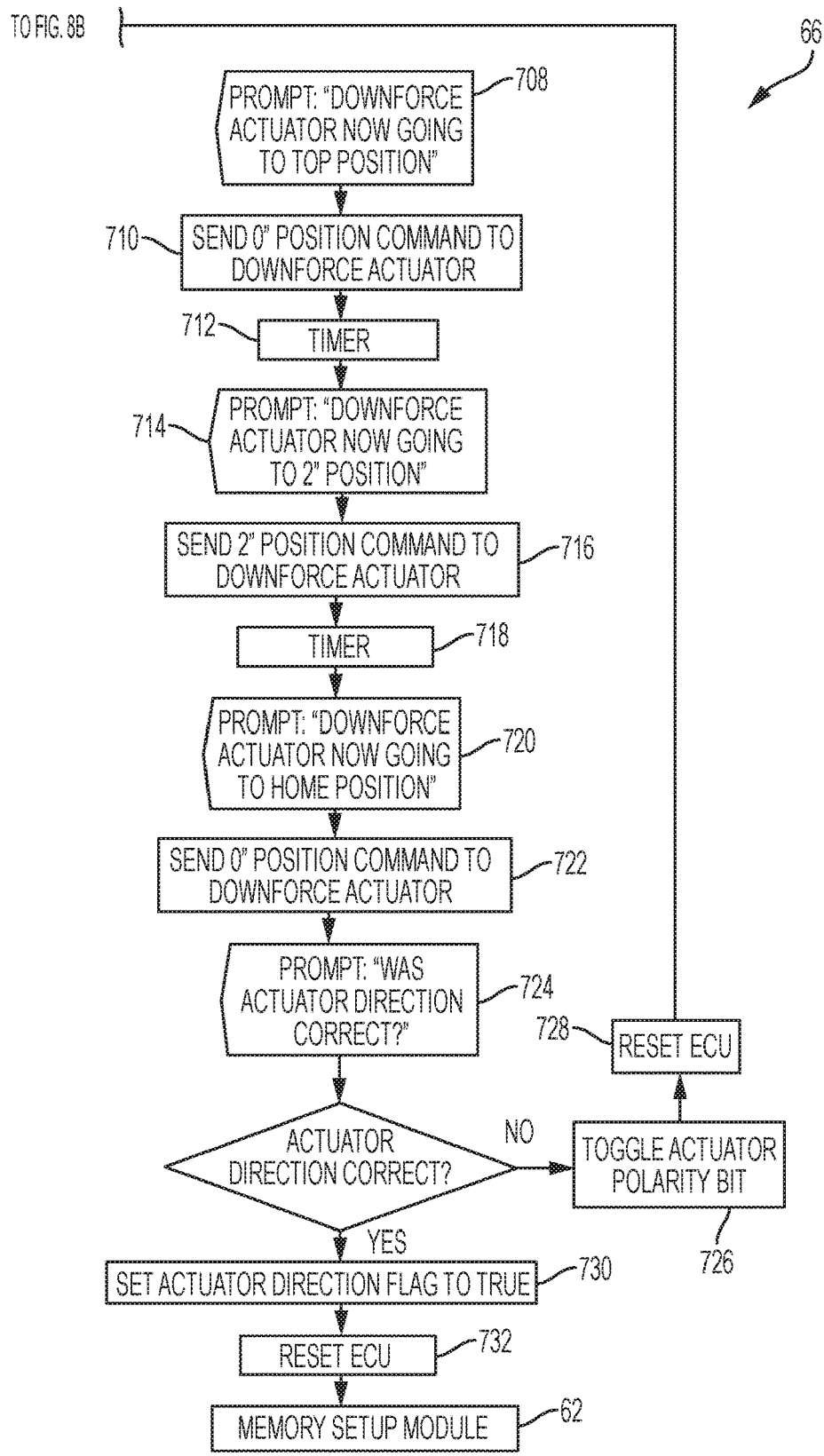

Referring to FIGS. 8A, 8B and 8C, the driving direction module 66 is generally configured to verify the direction of motion of any one of the actuators 22C, 24C, 26C, or the direction of rotation of any one of the motors 22B, 24B, 26B. Depending upon the type and functions of the various motorized devices 22, 24, 26, the configuration and/or routines of the module 66 may be different from one machine to the next.

In the example of an agricultural planter 20 and at block 700, the direction module 66 determines if verification of the drive direction of the down force device 22 is needed. If "no" and at block 702, the module 66 may determine if verification of the drive direction of the seed plate device 24 is needed. If "no" and at block 704, the module 66 may determine if verification of the drive direction of the seed depth device 26 is needed. If "no" and at block 706, the module 66 may prompt the user instructing the user to finish the memory setup, and the motor exchange system 56 by advance to the initialization module 58.

If the answer associated with block 700 is "yes", the direction module 66 may progress to block 708. At block 708, the module 66 may prompt the user by informing the user that the down force device 22 is now moving toward a specified position (e.g., top position). At block 710, the module 66 may send a zero position command to the down force device 22. At block 712, the module 66 may initiate and runs a timer to completion. This provides the user time to inspect and see movement of the actuator. At block 714, the module 66 may prompt the user informing the user that the down force device 22 is now going, for example, to a two inch position. At block 716, the module 66 may send, for example, a two inch position command to the down force device 22. At block 718, the module 66 the module 66 may initiate and runs a timer to completion. This provides the user time to inspect and see movement of the actuator. At block 720, the module 66 may notify the user that the down force device 22 is now proceeding to, for example, a home position. At block 722, the module 66 may send a zero position command to the down force device 22. At block 724, the module 66 may ask the user, via the user interface 30, if the device 22 is traveling in the correct direction.

If the user answers "no" to block 724 then at block 726, a motor polarity bit of the motor 22B may be toggled. At block 728, the controller 22A may be reset and the module 66 returns to start. If the user answers "yes" to block 724 then at block 730 the module 66 may set the direction flag associated with device 22 to "true". At block 732, the controller 22A may be reset and the motor exchange system 56 is advanced to the memory setup module 62.

If the answer associated with block 702 is "yes", the direction module 66 may progress to block 734. At block 734, the module 66 may prompt the user by informing the user, for example, that the motor 24B of the seed plate device 24 is now turning at a slow speed (e.g., about five revolutions per minute). This slow speed enables the user to visually determine the direction of rotation. At block 736 the module 66 may send a slow speed command to the seed plate controller 24A. At block 738, the module 66 may ask the user, via the user interface 30, if the device 24 is traveling in the correct direction.

If the user answers "no" to block 738 then at block 740, the direction module 66 may send a stop command (i.e., zero revolutions per minute command) to the seed plate controller 24A. At block 742, a motor polarity bit of the motor 24B may be toggled. At block 744, the controller 24A may be reset and the module 66 returns to start. If the user answers "yes" to block 738 then at block 746, the module 66 may set the direction flag associated with device 24 to "true". At block 748, the controller 24A may be reset and the motor exchange system 56 is advanced to the memory setup module 62.

If the answer associated with block 704 is "yes", the direction module 66 may progress to block 750. At block 750, the module 66 may inform the user, for example, that the seed depth device 26 is not going to a position zero. At block 752, the module 66 may send a zero position command to the seed depth device 26. At block 754, the module 66 may initiate and runs a timer to completion. This provides the user time to inspect and see movement of the actuator. At block 756, the module 66 may prompt the user, informing the user that the seed depth device 26 is now traveling in a specified actuator direction (e.g., positive direction) within a range of motion. At block 758, the module 66 may send, for example, a twenty position command to the seed depth device 26. At block 760, the module 66 may initiate and runs a timer to completion. This provides the user time to inspect and see movement of the actuator. At block 762, the module 66 may ask the user, via the user interface 30, if the device 26 is traveling in the correct direction.

If the user answers "no" to block 762 then at block 764, the direction module 66 may send a zero position command to the seed depth device 26. At block 766, a motor polarity bit of the motor 26B may be toggled. At block 769, the controller 26A may be reset and the module 66 returns to start. If the user answers "yes" to block 762 then at block 770 the module 66 may set the direction flag associated with device 26 to "true". At block 772, the controller 26A may be reset and the motor exchange system 56 is advanced to the memory setup module 62.

Advantages and benefits of the present disclosure includes a machine having a motor exchange system that facilitates a relatively simple, convenient, and controlled means of exchanging machine motors. The swapping of motors on the same machine, or the exchange of a motor, is enhanced by the motor exchange system with the recording and transfer capability of motor operating characteristics. Yet further, other benefits include an automated process that is performed as a result of exchanging a motor. The automated process assists a user in re-zeroing motorized devices, performing memory setups, and confirming motor direction.

The present disclosure may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or series of blocks in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A machine comprising:
   a first device including a first motor located at a first address and associated with first operating characteristic data;
   a second device including a second motor located at a second address and associated with second operating characteristic data, wherein the first and second operating characteristic data are the same;
   at least one controller including a computing processor and a computer readable storage medium, wherein the at least one controller is configured to communicate with the first and second devices, and store the first and second operating characteristic data while associating the first and second operating characteristic data with the first and second addresses, and wherein the exchange of at least one of the first and second motors causes an exchange of the associated one of the first and second operating characteristic data
   a user interface configured to communicate with the at least one controller; and
   a motor exchange system configured to be at least in part executed by the at least one controller, the motor exchange system including a motor exchange module configured to prompt a user via the user interface to identify one of the first and second addresses associated with a motor exchange, read an exchange operating characteristic data associated with the exchange motor, and compare the exchange operating characteristic data to one of the first and second operating characteristic data associated with the first or second motor selected by the user as the exchanged motor, the motor exchange module being configured to recognize the motor exchange as being successful if the exchange operating characteristic data is the same as the selected one of the first and second operating characteristic data.

2. The machine set forth in claim 1, wherein the exchange motor is a new motor and the exchange operating characteristic data is new operating characteristic data.

3. The machine set forth m claim 2, further comprising: a reader, wherein the new operating characteristic data is recorded on the new motor that is readable by the reader, and the reader is configured to download the new operating characteristic data to the at least one controller.

4. The machine set forth in claim 1, wherein the motor exchange module includes a swap motor submodule and a new motor submodule.

5. The machine set forth in claim 1, wherein the exchange motor is the first motor and the user selected address is the second address.

6. The machine set forth in claim 1, wherein the machine is an agricultural planter.

7. The machine set forth in claim 6, further comprising:
a seed depth device including a seed depth motor associated with third operating characteristic data being the same as the first and second operating characteristic data, and wherein the first device is a down force device and the second device is a seed plate device.

8. The machine set forth in claim 1, wherein the first and second motors arc brushless motors.

9. A computer program product for a machine having a plurality of motorized devices including a first motorized device and a second motorized device each having common operating characteristics, the computer program product comprising:
a motor exchange module configured to assist in a motor exchange of an exchanged motor of at least one of the plurality of motorized devices with an exchange motor, compare operating characteristic data of the exchanged motor with operating characteristic data of the exchange motor to determine exchange success, and associate and record the operating characteristic data of the exchange motor with an address of the at least one of the plurality of motorized devices, the computer program product being executed by a processor of the machine and stored in at least one computer writeable and readable storage medium, the motor exchange module being configured to recognize the motor exchange as being successful if the exchange operating characteristic data is the same as the selected one of the first and second operating characteristic data; and
a memory setup module configured to establish a layout of the motorized devices as a result of the motor exchange, the memory setup module being an Electrically Erasable Programmable Read-Only Memory (EEPROM).

10. The computer program product set forth in claim 9, wherein the exchange is a success if the operating characteristic data of the exchange motor is the same as the operating characteristic data of the exchanged motor.

11. The computer program product set forth in claim 10, wherein the exchange motor is a new motor.

12. The computer program product set forth in claim 10, wherein the exchange motor originates as part of a motorized device of the plurality of devices.

13. The computer program product set forth in claim 10, wherein the motor exchange module includes a diagnostic module configured to re-attempt the comparison of operating characteristic data if the operating characteristic data of the exchange motor is not the same as the operating characteristic data of the exchanged motor.

14. The computer program product set forth in claim 9, further comprising:
a re-zero module configured to confirm desired positioning of an actuator of the at least one of the plurality of motorized devices.

15. The computer program product set forth in claim 14, wherein the plurality of motorized devices includes a first motorized device and a second motorized device that is constructed and arranged to perform a function that is different than the first motorized device, and the re-zero module is configured to recognize the functions.

16. The computer program product set forth in claim 9, further comprising:
a driving direction module configured to establish a desired driving direction of an actuator of the at least one of the plurality of motorized devices.

* * * * *